US010737240B2

(12) United States Patent
Lu et al.

(10) Patent No.: US 10,737,240 B2
(45) Date of Patent: Aug. 11, 2020

(54) 3D RUTHENIUM / GRAPHENE AEROGEL COMPOSITE LOADED WITH METAL-ORGANIC FRAMEWORKS, PREPARATION METHOD THEREOF, AND ITS APPLICATION IN CONTINUOUS TREATMENT OF CO

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 125 days.

(21) Appl. No.: 16/172,740

(22) Filed: Oct. 27, 2018

(65) Prior Publication Data

US 2019/0126236 A1 May 2, 2019

(30) Foreign Application Priority Data

Oct. 27, 2017 (CN) .......................... 2017 1 1053331

(51) Int. Cl.
    *B01J 20/22* (2006.01)
    *B01J 20/20* (2006.01)
    (Continued)

(52) U.S. Cl.
    CPC ............. *B01J 20/226* (2013.01); *B01J 20/20* (2013.01); *B01J 20/28047* (2013.01);
    (Continued)

(58) Field of Classification Search
    CPC ..... B01J 20/226; B01J 20/20; B01J 20/28047
    See application file for complete search history.

(56) References Cited

FOREIGN PATENT DOCUMENTS

CN          107215863 A  *  9/2017

OTHER PUBLICATIONS

Li et al (Flexible Ru/Graphene Aerogel with Switchable Surface Chemistry: Highly Efficient Catalyst for Room-Temperature CO Oxidation, Adv. Mat. Int. (2016), 3, 1500711). (Year: 2016).*

(Continued)

*Primary Examiner* — Patricia L. Hailey
*Assistant Examiner* — Michael Forrest
(74) *Attorney, Agent, or Firm* — SZDC Law P.C.

(57) ABSTRACT

A 3D ruthenium/graphene aerogel composite loaded with MOF, preparation method thereof, and its application in continuous treatment of CO are disclosed. Using a simple solvothermal method, ruthenium is simultaneously embedded in the aerogel formation process to form a 3D ruthenium/graphene aerogel, which is freeze-dried; the dried aerogel is surface carboxylated, and the MOF material is modified on the surface by step-by-step assemble strategy, and finally the ruthenium/graphene aerogel composite loaded with MOF is obtained. Also disclosed are a simple method, and a cycle involving the simultaneous adsorption and catalytic oxidation of CO eventually formed due to the adsorption ability of MOF and the catalytic ability of catalysts. Furthermore, the adsorption of MOF can increase the instantaneous concentration of CO around the catalyst, which in turn increases the reaction rate. In particular, the product prepared by the simple method has excellent properties for catalytic CO performance.

9 Claims, 4 Drawing Sheets

(51) Int. Cl.
*B01J 20/28* (2006.01)
*B01J 13/00* (2006.01)

(52) U.S. Cl.
CPC ........ *B01J 13/0091* (2013.01); *B01J 2220/46* (2013.01); *B01J 2531/821* (2013.01); *Y02A 50/2341* (2018.01)

(56) References Cited

OTHER PUBLICATIONS

Xu et al (Facial fabrication of three-dimensional graphene and metal-organic framework composites and their derivatives for flexible all-solid-state supercapacitors, Chem. Mater. (2017), 29, 14, 6058-6065). (Year: 2017).*

* cited by examiner

3D RUTHENIUM / GRAPHENE AEROGEL COMPOSITE LOADED WITH METAL-ORGANIC FRAMEWORKS, PREPARATION METHOD THEREOF, AND ITS APPLICATION IN CONTINUOUS TREATMENT OF CO

This application claims priority to Chinese Patent Application No.: 201711053331.1, filed on Oct. 27, 2017, which is incorporated by reference for all purposes as if fully set forth herein.

FIELD OF THE INVENTION

The present invention relates to the field of nanocomposite materials, specifically relates to a 3D ruthenium/graphene aerogel composite loaded with MOF, preparation method thereof, and its application in continuous treatment of CO.

TECHNICAL BACKGROUND

In recent years, with the rapid development of technology and rapid industrialization, the emission of toxic gases such as CO, $SO_2$ and $NO_2$ is seriously exceeded the standard, which has damaged the ecological environment and harmed human health. CO is one of the most common and most harmful toxic gases, the emissions of CO gas mainly from the car exhaust and the inadequate combustion of coal, it is colorless and tasteless, and can quickly combine with the human hemoglobin, exclusion of oxygen, resulting in human hypoxia, it is seriously harm to human body health. Therefore, the treatment of CO gas pollution is imminent, it is a promising and widely used method for the treatment of CO to use the metal nanoparticles. Metal-organic frameworks (MOFs) are formed by assembling metal ions and organic ligands that have significant applications in drug delivery, catalysis, etc. To date, there have no report on treatment the CO by simultaneous adsorption and catalysis about catalysts.

SUMMARY OF THE INVENTION

The object of the present invention is to provide a 3D ruthenium/graphene aerogel composite loaded with metal-organic frameworks (MOF) and its preparation method. Using a simple hydrothermal method, 3D ruthenium/graphene aerogel is prepared in one step, the MOF material in immobilized on the surface of the aerogel by step-by-step assemble strategy, so as to realize the absorption of CO gas by the MOF material and increase the concentration of CO around the catalyst, to achieve continuous treatment of CO gas in the air or discharged by engines.

In order to achieve the above object, the present invention adopts the following specific technical scheme:

A preparation method of 3D ruthenium/graphene aerogel composite loaded with metal-organic frameworks, characterized in comprising the following steps:

(1) adding ruthenium trichloride and graphene oxide in ethylene glycol, reacting after sonication; and then freeze-drying to obtain a 3D ruthenium/graphene aerogel;

(2) taking surface carboxylation to said 3D ruthenium/graphene aerogel, to obtain a 3D ruthenium/graphene aerogel composite with carboxyl groups on the surface;

(3) modifying MOF material on the surface of 3D ruthenium/graphene aerogel, to obtain 3D ruthenium/graphene aerogel composite loaded with MOF.

The present invention also disclosed a preparation method of 3D ruthenium/graphene aerogel, characterized in comprising the following steps:

adding ruthenium trichloride and graphene oxide in ethylene glycol, reacting after sonication; and then freeze-drying to obtain a 3D ruthenium/graphene aerogel.

The present invention also disclosed A preparation method of 3D ruthenium/graphene aerogel composite with carboxyl groups on the surface, characterized in comprising the following steps:

(1) adding ruthenium trichloride and graphene oxide in ethylene glycol, reacting after sonication; and then freeze-drying to obtain a 3D ruthenium/graphene aerogel;

(2) taking surface carboxylation to said 3D ruthenium/graphene aerogel, to obtain a 3D ruthenium/graphene aerogel composite with carboxyl groups on the surface.

The 3D ruthenium/graphene aerogel composite loaded with MOF disclosed in the present invention is a kind of composite material of 3D ruthenium/graphene aerogel modified with metal-organic frameworks (MOF) on the surface. It's preparation method can include the following steps:

(1) using ethylene glycol as a solvent and a reducing agent, the ruthenium trichloride solution and the graphene oxide are ultrasonicated in ethylene glycol, then transferred to a reaction kettle, and then freeze-dried in a freeze dryer to obtain a 3D ruthenium/graphene aerogel;

(2) taking surface carboxylation to said 3D ruthenium/graphene aerogel, to obtain a 3D ruthenium/graphene aerogel composite with carboxyl groups on the surface;

(3) modifying MOF material on the surface of 3D ruthenium/graphene aerogel by step-by-step assemble strategy, to obtain 3D ruthenium/graphene aerogel composite loaded with MOF.

In the above technical solution, in step (1), the mass ratio of ruthenium trichloride, graphene oxide and ethylene glycol is 10:15:4000, the reaction temperature is 170 to 200° C., the reaction time is 18 to 36 hours, preferably 24 hours; preferably, first adding said graphene oxide in ethylene glycol for sonication, and then adding the solution of ruthenium trichloride, mixing uniformly and putting into a reaction kettle for reaction, preferably reacting at 180° C.

In the present invention, the 3D ruthenium/graphene aerogel material (Ru/GA) is first prepared by simple synthetic method, it has a large specific surface area, uniform pore size, good conductivity, controllable structure, and good reproducibility, ruthenium nanoparticles can be embedded directly into the graphene aerogel in one step, and the graphene aerogel can be used as a good container for loading ruthenium nanoparticles, the open macroporous structure of graphene aerogels provides pathways for the access and diffusion of gas molecules while the larger specific surface area can promote catalytic performance, it is also a good support.

In the above technical solution, in the step (2), the 3D ruthenium/graphene aerogel is surface carboxylated with succinic anhydride, 3-aminopropyltriethoxysilane and N, N-dimethylformamide; and the mass ratio of succinic anhydride, 3-aminopropyltriethoxysilane, and N, N-dimethylformamide is 0.9: (1.9 to 2): (56 to 57); the reaction temperature is 25° C. to 30° C.; preferably, first adding said succinic anhydride and 3-aminopropyltriethoxysilane into N, N-dimethylformamide, stirring for 3 to 5 hours, stirring time is preferably 4 hours; then adding Ru/GA and deionized water, stirring at room temperature for 8 to 10 hours (preferably 8 hours) to surface carboxylating the 3D ruthenium/graphene aerogel.

In the present invention, the MOF (metal organic framework) material is combined with the catalyst by a simple step-by-step self-assembly method. The MOF material has a large specific surface area and a good gas adsorption performance. The adsorption capacity of the MOF material can increase the instantaneous concentration of CO around the catalyst, which in turn increases the reaction rate.

In the above technical solution, in the step (3), the 3D ruthenium/graphene aerogel composite with carboxyl groups on the surface is sequentially reacted with copper nitrate and trimesic acid to modify the MOF material on the surface of 3D ruthenium/graphene aerogel; preferably, the 3D ruthenium/graphene aerogel composite with carboxyl groups on the surface is sequentially reacted with copper nitrate and trimesic acid for 10 times; the mass ratio of copper nitrate and trimesic acid is 6:3. Preferably, the 3D ruthenium/graphene aerogel composite with carboxyl groups on the surface is first placed in an ethanol solution of copper nitrate to shake for 15-20 minutes, preferably 15 minutes, then washed with ethanol, and then shaken in a solution of trimesic acid for 20 to 30 min, preferably 30 minutes, and then washed with ethanol, repeating the process.

The present invention adopts a simple hydrothermal method to directly insert the ruthenium nanoparticles into the graphene aerogel, and then modifies the MOF material on the surface of Ru/GA by a simple self-assembly method. The ruthenium nanoparticles are extremely small and uniformly loaded into the support, the MOF material has better adsorption performance on CO, which is beneficial to the continuous adsorption and catalytic CO oxidation.

The present invention further disclosed 3D ruthenium/graphene aerogel composite loaded with metal-organic frameworks prepared by said preparation method of 3D ruthenium/graphene aerogel composite loaded with metal-organic frameworks; 3D ruthenium/graphene aerogel prepared by said preparation method of 3D ruthenium/graphene aerogel; and 3D ruthenium/graphene aerogel composite with carboxyl groups on the surface prepared by said preparation method of 3D ruthenium/graphene aerogel composite with carboxyl groups on the surface.

The present invention further disclosed the use of said 3D ruthenium/graphene aerogel composite loaded with metal-organic frameworks, said 3D ruthenium/graphene aerogel, or said 3D ruthenium/graphene aerogel composite with carboxyl groups on the surface in the continuous treatment of CO; or the use of said 3D ruthenium/graphene aerogel composite loaded with metal-organic frameworks, said 3D ruthenium/graphene aerogel, or said 3D ruthenium/graphene aerogel composite with carboxyl groups on the surface in the preparation of catalyst for continuous treatment of CO; or the use of said 3D ruthenium/graphene aerogel, or said 3D ruthenium/graphene aerogel composite with carboxyl groups on the surface in the preparation of 3D ruthenium/graphene aerogel composite loaded with metal-organic frameworks.

Preferably, the composite material of the present invention is pretreated at 100 to 200° C., preferably 150° C., before using in the continuous treatment of CO.

The composite material disclosed in the present invention increases the reaction rate through increasing the instantaneous concentration of CO around the catalyst by adsorption. The composite is placed in CO atmosphere to complete the treatment of CO.

ADVANTAGES OF THE PRESENT INVENTION

1. In the present invention, the formed Ru nanoparticles are minimally and uniformly. And the graphene aerogels has a large specific surface area, uniform pore size, good conductivity, controllable structure, and good reproducibility. The MOF material has a large specific surface area and a good gas adsorption performance.

2. In the present invention, the adsorption of MOF can increase the instantaneous concentration of CO around the catalyst, which in turn increases the reaction rate. In particular, the product prepared by the simple method has excellent properties for catalytic CO performance, which is very advantageous for industrial applications.

3. In the present invention, the ruthenium nanoparticles have higher catalytic activity. Moreover, the catalytic activity is obviously improved after gentle treatment. At the same time, graphene has high specific surface area, good stability, controllable structure and high porosity. As a good carrier of metal nanoparticle catalyst, it not only retains the advantages of the original carbon material, but also the open macroporous structure can provide pathways for the access and diffusion of gas molecules. In particular, the composite materials can increase the instantaneous concentration of CO around the catalyst, which in turn increases the reaction rate. And this technology has not been reported, the invention combines the MOF material with the catalyst perfectly and can make it more widely used in the field of catalytic CO.

DETAILED DESCRIPTION OF THE INVENTION

Implementation 1

Preparation of 3D Ru/graphene aerogel (Ru/GA), comprising the following steps:

0.14 g of GO is dispersed in 35 ml of ethylene glycol. Then, the solution of $RuCl_3$ (0.2 mol/L, 2 ml) is added in and mixed uniformly. The mixture is then transferred into a 50 ml hydrothermal reactor, heated and maintained at 180° C. for 24 h. Then the product is washed in water and ethanol, and then freeze-drying in a freeze-drying oven to obtain 3D Ru/graphene aerogel (Ru/GA).

Figure 1:
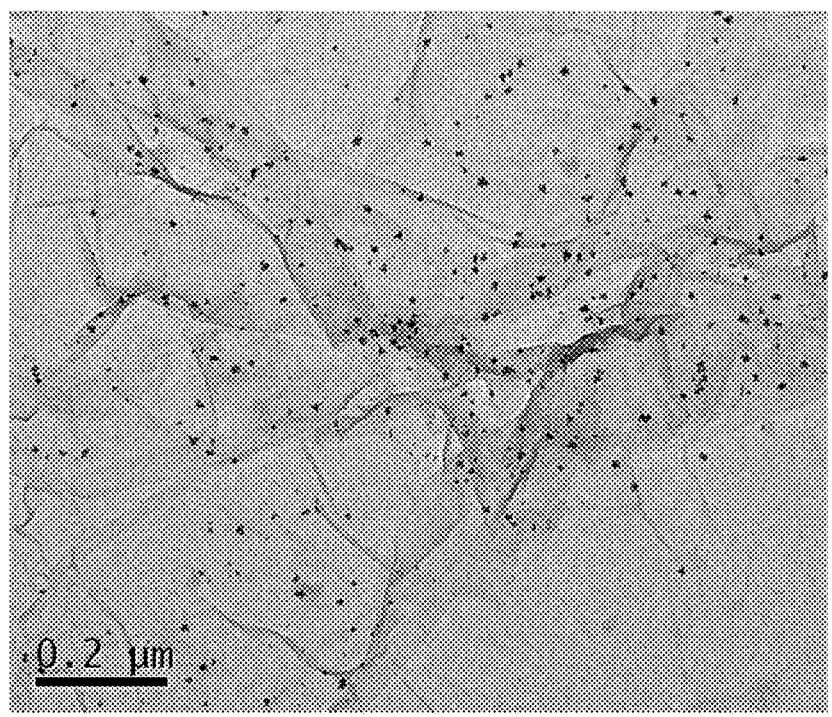
FIG. 1 is a TEM image of ruthenium/graphene aerogel (Ru/GA).
Figure 2:
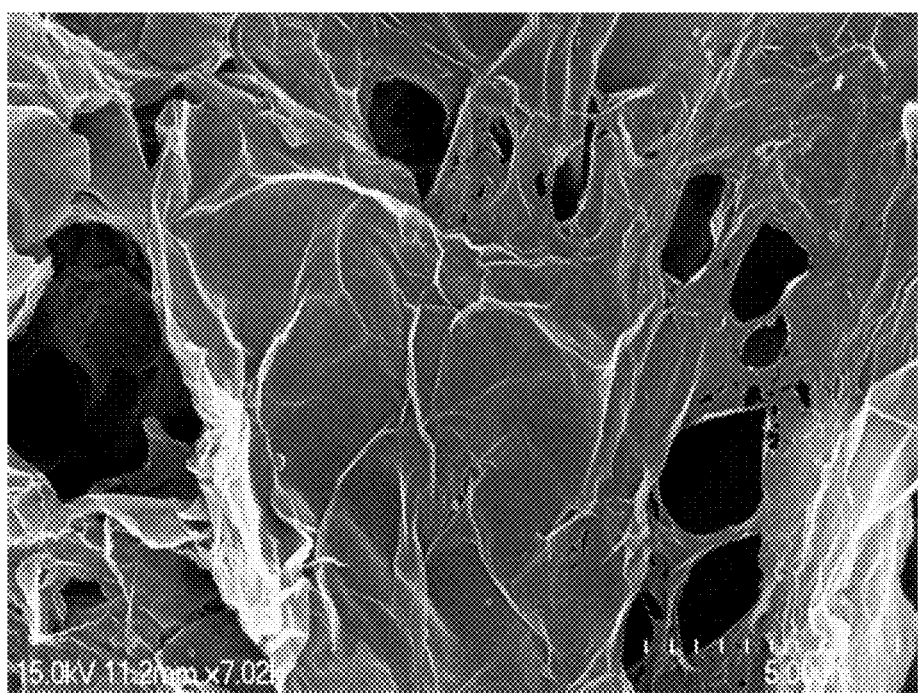
FIG. 2 is an SEM image of ruthenium/graphene aerogel (Ru/GA).

FIG. 1 shows a TEM image of Ru/GA. FIG. 2 shows a SEM image of Ru/GA. It can be seen from the TEM image that the ruthenium nanoparticles are successfully loaded into the graphene aerogels and the distribution is relatively uniform. From the SEM image we can see the graphene aerogel has larger pores.

Implementation 2

Preparation of the Composite of Metal-Organic Frameworks Immobilized on the Three-Dimensional Ru/Graphene Aerogel (3D Ru/GA-HK):

1 ml of 3-Aminopropyltriethoxysilane (APTES) is gradually added to 30 ml of DMF containing 0.45 g of succinic anhydride under continuous stirring for 3 to 5 h at 25 to 30° C. Then, Ru/GA and 1 ml of deionized water are added to the above solutions. The mixture is kept agitating for another 8 to 10 h at 25 to 30° C. Finally, the modified Ru/GA is washed with deionized water and ethanol to obtain the materials.

Figure 3:
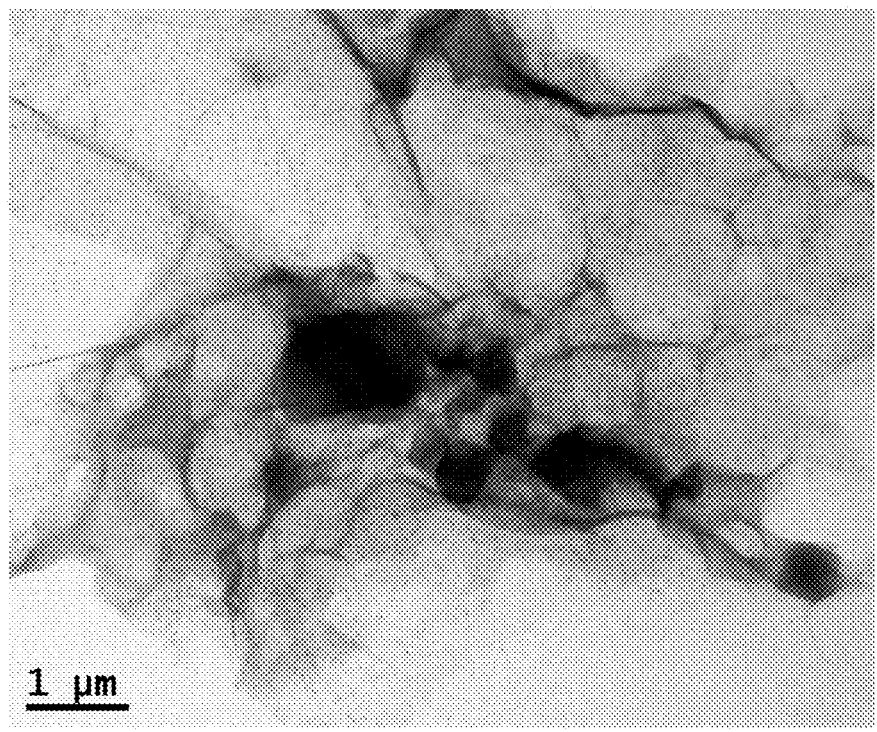
FIG. 3 is a TEM image of 3D ruthenium/graphene aerogel composite loaded with metal-organic frameworks (MOF) (Ru/GA-HK).
Figure 4:
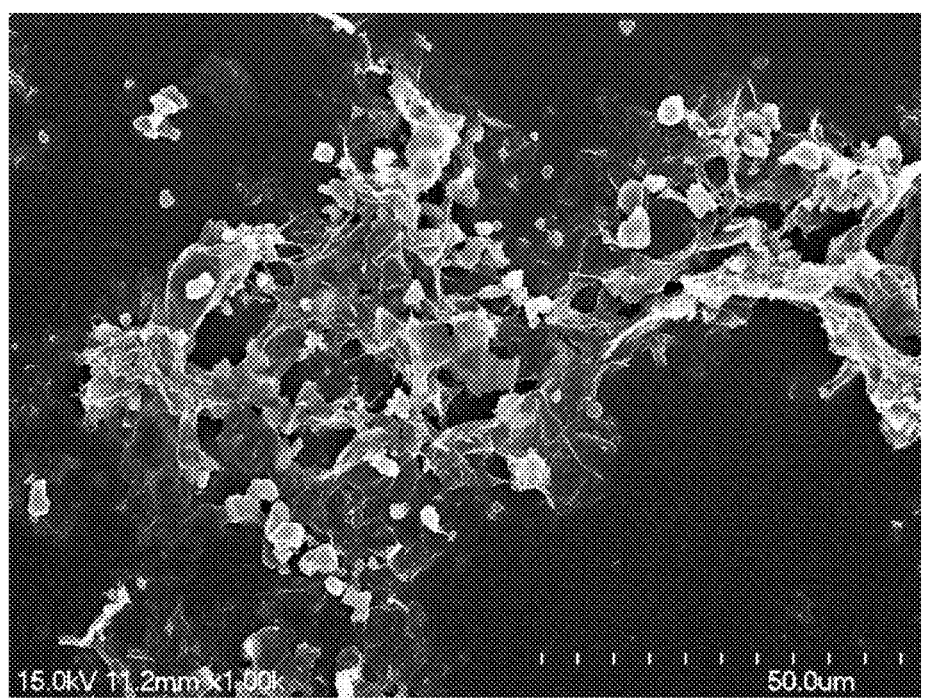
FIG. 4 is an SEM image of 3D ruthenium/graphene aerogel composite loaded with metal-organic frameworks (MOF) (Ru/GA-HK).

The above products are dissolved in 0.02 M of ethanol solution of $Cu(NO_3)_2$ under agitating for 15 to 20 minutes, and then the Ru/GA is washed with ethanol. The product is put in 0.01 M of $H_3$btc ethanol solution under agitating for 20 to 30 minutes at room temperature. And then the process is repeated for 10 times to obtain the Ru/GA-HK. FIG. 3 showed the TEM images of the 3D Ru/GA-HK. FIG. 2 showed the SEM images of the 3D Ru/GA-HK. It can be seen from the figure that the MOF material is successfully loaded onto the Ru/GA.

Implementation 3

The composite is placed in CO atmosphere and continuously catalyze CO oxidation.

The prepared 500 mg of Ru/GA and Ru/GA-HK is directly put into a 1% CO atmosphere for catalysis of CO oxidation.

The Ru/GA-HK is pre-treated at different temperatures for 30 minutes. Then the treated Ru/GA-HK is directly put into a 1% CO atmosphere for catalysis of CO oxidation.

The CO conversion is analyzed by gas chromatography. That is, through the standard gas to develop a standard curve, and the concentration of CO recorded as 1, and then with the catalytic progress, the concentration gradually decreased, resulting in a specific CO conversion results.

Figure 5:
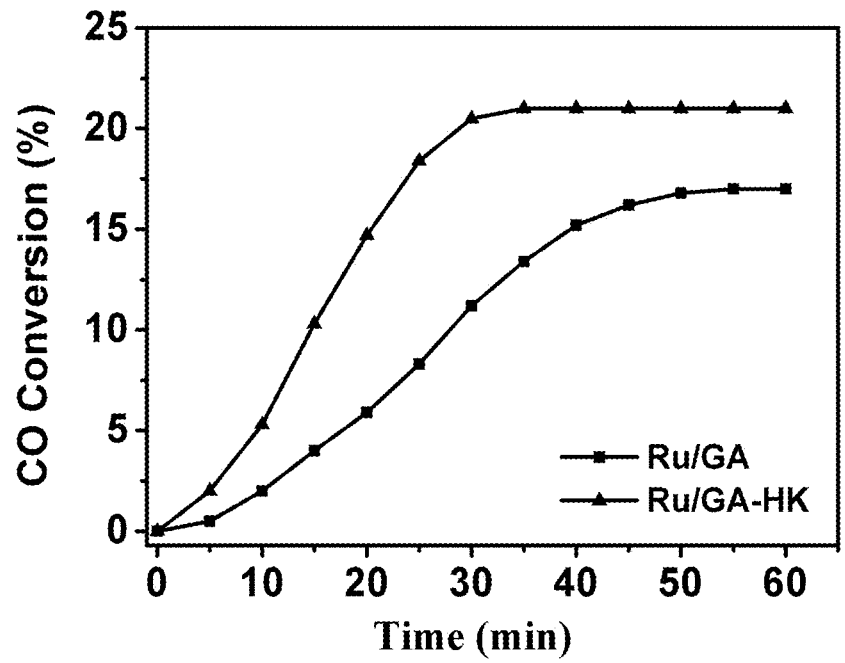
FIG. 5 shows CO conversion at room temperature by the Ru/GA and Ru/GA-HK catalysts.
Figure 6:
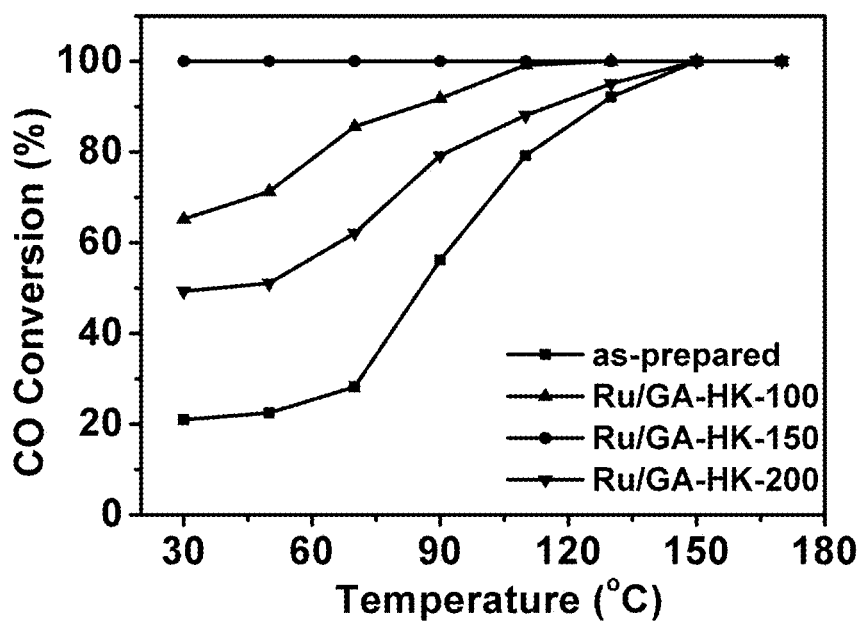
FIG. 6 shows CO conversion of Ru/GA-HK catalyst by different treatment temperature.
Figure 7:
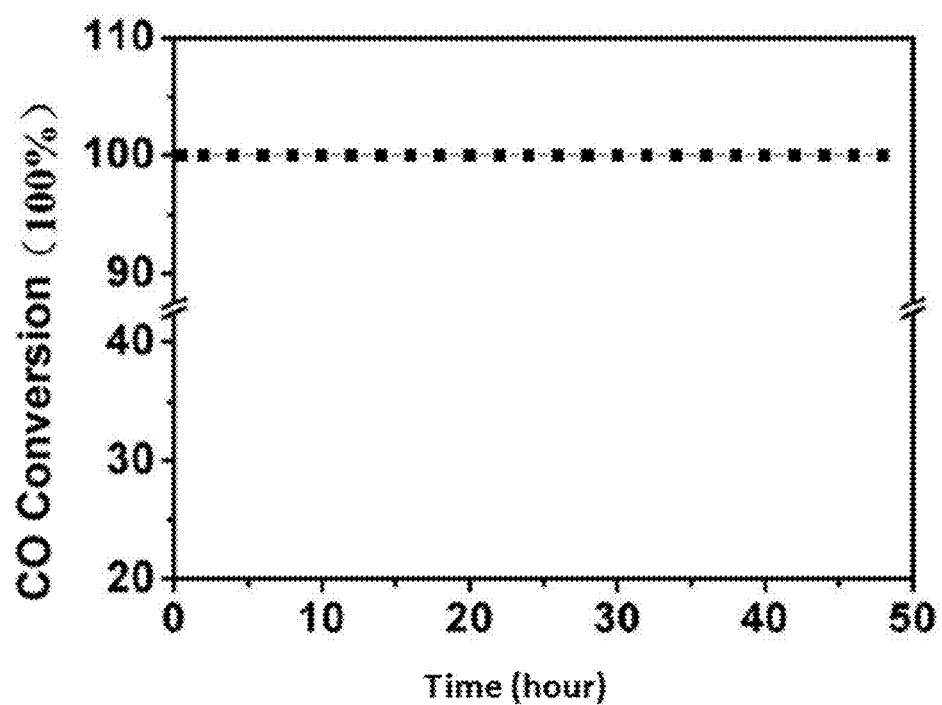
FIG. 7 shows durability of Ru/GA-HK pretreated at 150° C.

FIG. 5 showed the CO conversion at room temperature by the Ru/GA and Ru/GA-HK catalysts. FIG. 6 showed the CO conversion of Ru/GA-HK catalyst by different treatment temperature. It can be seen from FIG. 5 that Ru/GA showed a lower conversion ratio after the same reaction duration compared with the Ru/GA-HK. And the catalytic efficiency is enhanced by 56.7% compared with that of Ru/GA after 35 minutes. FIG. 6 shows that the catalyst shows a high catalytic activity after treatment at 150° C., and the conversion can be achieved 100% at room temperature. FIG. 7 showed the durability of Ru/GA-HK-150 for CO oxidation. It could be seen form the figure that the activity of the catalyst could be maintained for 48 h without any noticeable decrease. The performance is conducive to the practical application of the present invention. CO pollution in the atmosphere mainly from the exhaust emissions of vehicles, the calculation method of CO conversion rate as shown in equation (1):

$$\eta = \frac{C_0 - C}{C_0} \times 100\% \quad (1)$$

$C_0$ and C are the initial and measured concentration (every 30 minutes) of CO, respectively.

What is claimed is:

1. A preparation method of 3D ruthenium/graphene aerogel composite loaded with metal-organic frameworks, characterized in comprising the following steps:
   (1) adding ruthenium trichloride and graphene oxide in ethylene glycol, reacting after sonication; and then freeze-drying to obtain a 3D ruthenium/graphene aerogel;
   (2) surface carboxylating the 3D ruthenium/graphene aerogel, to obtain a 3D ruthenium/graphene aerogel composite with carboxyl groups on the surface;
   (3) modifying the surface of 3D ruthenium/graphene aerogel with MOF material, to obtain 3D ruthenium/graphene aerogel composite loaded with MOF.

2. The preparation method of 3D ruthenium/graphene aerogel composite loaded with metal-organic frameworks according to claim 1, wherein in step (1), the mass ratio of ruthenium trichloride, graphene oxide and ethylene glycol is 10:15:4000, the reaction temperature is 170 to 200° C., and the reaction time is 18 to 36 h.

3. The preparation method of 3D ruthenium/graphene aerogel composite loaded with metal-organic frameworks according to claim 1, wherein in step (1), first adding said graphene oxide in ethylene glycol for sonication, and then adding the solution of ruthenium trichloride, reacting after sonication; after the reaction, the product is washed with water and ethanol, and then freeze-drying.

4. The preparation method of 3D ruthenium/graphene aerogel composite loaded with metal-organic frameworks according to claim 1, wherein in step (2), the 3D ruthenium/graphene aerogel is surface carboxylated with succinic anhydride, 3-aminopropyltriethoxysilane and N, N-dimethylformamide; and the mass ratio of succinic anhydride, 3-aminopropyltriethoxysilane, and N, N-dimethylformamide is 0.9: (1.9 to 2): (56 to 57).

5. The preparation method of 3D ruthenium/graphene aerogel composite loaded with metal-organic frameworks according to claim 4, wherein step (2) consists of first adding said succinic anhydride and 3-aminopropyltriethoxysilane into N, N-dimethylformamide, stirring at 25° C. to 30° C. for 3 to 5 hours; then adding 3D ruthenium/graphene aerogel, and stirring at room temperature for 8 to 10 hours to surface carboxylating the 3D ruthenium/graphene aerogel.

6. The preparation method of 3D ruthenium/graphene aerogel composite loaded with metal-organic frameworks according to claim 1, wherein in step (3), the 3D ruthenium/graphene aerogel composite with carboxyl groups on the surface is sequentially reacted with copper nitrate and trimesic acid to modify the surface of 3D ruthenium/graphene aerogel with the MOF material; the mass ratio of copper nitrate and trimesic acid is 6:3.

7. 3D ruthenium/graphene aerogel composite loaded with metal-organic frameworks prepared by the preparation method of 3D ruthenium/graphene aerogel composite loaded with metal-organic frameworks according to claim 1.

8. A preparation method of 3D ruthenium/graphene aerogel composite with carboxyl groups on the surface, characterized in comprising the following steps:
   (1) adding ruthenium trichloride and graphene oxide in ethylene glycol, reacting after sonication; and then freeze-drying to obtain a 3D ruthenium/graphene aerogel;
   (2) surface carboxylating the 3D ruthenium/graphene aerogel, to obtain a 3D ruthenium/graphene aerogel composite with carboxyl groups on the surface.

9. 3D ruthenium/graphene aerogel composite with carboxyl groups on the surface prepared by the preparation method of 3D ruthenium/graphene aerogel composite with carboxyl groups on the surface according to claim 8.

* * * * *